(12) United States Patent
Nowatzyk et al.

(10) Patent No.: US 8,619,065 B2
(45) Date of Patent: Dec. 31, 2013

(54) UNIVERSAL STYLUS DEVICE

(75) Inventors: Andreas Nowatzyk, San Jose, CA (US); Charles P. Thacker, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 358 days.

(21) Appl. No.: 13/025,165

(22) Filed: Feb. 11, 2011

(65) Prior Publication Data

US 2012/0206349 A1 Aug. 16, 2012

(51) Int. Cl.
*G06F 3/033* (2013.01)

(52) U.S. Cl.
USPC ...... 345/179; 345/158; 178/19.01; 178/19.05

(58) Field of Classification Search
USPC .................. 178/19.01, 19.05; 345/158, 179; 382/188, 314
See application file for complete search history.

(56) References Cited

U.S. PATENT DOCUMENTS

| 5,442,147 | A | * | 8/1995 | Burns et al. ................ | 178/18.09 |
| 5,576,727 | A | | 11/1996 | Rosenberg et al. | |
| 5,596,692 | A | * | 1/1997 | Martin et al. ................ | 345/443 |
| 5,959,617 | A | * | 9/1999 | Bird et al. ................... | 345/182 |
| 6,408,253 | B2 | | 6/2002 | Rosenberg et al. | |
| 6,970,583 | B2 | | 11/2005 | Black | |
| 7,646,377 | B2 | | 1/2010 | Geaghan | |
| 2002/0148655 | A1 | * | 10/2002 | Cho et al. ................... | 178/18.09 |
| 2005/0020303 | A1 | | 1/2005 | Chan | |
| 2005/0110781 | A1 | * | 5/2005 | Geaghan et al. ............. | 345/180 |
| 2005/0156914 | A1 | * | 7/2005 | Lipman et al. ............... | 345/179 |
| 2005/0156915 | A1 | | 7/2005 | Fisher | |
| 2005/0236492 | A1 | * | 10/2005 | Ladas et al. ................ | 235/494 |
| 2006/0028457 | A1 | | 2/2006 | Burns | |
| 2006/0138228 | A1 | | 6/2006 | Sanders et al. | |
| 2006/0250381 | A1 | * | 11/2006 | Geaghan ...................... | 345/179 |
| 2007/0041654 | A1 | * | 2/2007 | Wang et al. ................... | 382/260 |
| 2007/0114367 | A1 | * | 5/2007 | Craven-Bartle et al. . | 250/227.13 |
| 2008/0041441 | A1 | * | 2/2008 | Schwartzman .............. | 136/246 |
| 2009/0040195 | A1 | * | 2/2009 | Njolstad et al. .............. | 345/180 |
| 2010/0328272 | A1 | * | 12/2010 | Craven-Bartle et al. ...... | 345/179 |

FOREIGN PATENT DOCUMENTS

| JP | 2000339397 | A | 12/2000 |
| KR | 1020010016506 | A | 3/2001 |
| KR | 100438846 | B1 | 7/2004 |
| KR | 1020050077230 | A | 8/2005 |

OTHER PUBLICATIONS

"International Search Report", Mailed Date—Sep. 3, 2012, Application No. PCT/US2012/021783, Filed Date—Jan. 18, 2012, pp. 8.
"Wacom Interactive Pen Display DTU-710—digitizer, stylus", Retrieved at << http://reviews.cnet.com/pointing-devices/wacom-interactive-pen-display/1707-3147_7-31958743.html >>, Jun. 25, 2006, pp. 5.
"InfoPad Paperless Form Processing Solution featuring the Wacom SignPAD on show at CeBIT Sydney", Retrieved at << http://www.wacom.com.sg/news/story/infopad-paperless-form-processing-solution-featuring-wacom-signpad-show-cebit-sydney >>, May 12, 2008, pp. 3.

* cited by examiner

*Primary Examiner* — Koosha Sharifi-Tafreshi
(74) *Attorney, Agent, or Firm* — Microsoft Corporation

(57) ABSTRACT

A stylus device receives light from a display though an optical element that is adapted to increase the field curvature of an image formed on an image sensor of the stylus device. Based on the size and shape of a portion of the image that is in focus, a distance, orientation, and/or azimuth of the stylus device with respect to the display can be determined. In addition, a position corresponding to each pixel, or groups of pixels, is encoded into blue light emitted by each pixel or group of pixels of the display. Upon initialization, or after a loss of synchronization, the stylus device can determine its position with respect to the pixels by decoding the encoded position. After synchronizing its position with the display, the stylus device can determine its subsequent positions by tracking pixels of the display.

17 Claims, 7 Drawing Sheets

FIG. 5

UNIVERSAL STYLUS DEVICE

BACKGROUND

Stylus devices, commonly used for input by tablet computing devices, are typically implemented using one or more of ultrasound, surface acoustic waves, electro-magnetic, and electro-static systems. In electro-magnetic systems, a sensor array is typically installed behind the display of the tablet device. The position of the stylus device with respect to the display is determined based on signals received from the sensory array. Electro-static systems may use an array of transparent electrodes to sense a signal emitted from a stylus device. While these systems are effective, the sensor arrays must be built into the display and therefore cannot be added by a user at a later time.

SUMMARY

A stylus device is provided that receives light from a display though an optical element that is adapted to increase the field curvature of an image formed on an image sensor of the stylus device. Based on the size and shape of a portion of the image that is in focus, a distance, orientation, and azimuth of the stylus device with respect to the display can be determined. In addition, a position corresponding to each pixel, or groups of pixels, is encoded into blue light emitted by each pixel or group of pixels of the display. Upon initialization, or after a loss of synchronization, the stylus device can determine its position with respect to the pixels by decoding the encoded position. After synchronizing its position with the display, the stylus device can determine its subsequent positions by tracking pixels of the display.

In an implementation, light emitted from a display is received at an image sensor of a stylus device. The light is received through an optical element that increases a field curvature of an image formed on the image sensor. A portion of the image that is in focus is determined by the image sensor. A size of the portion of the image that is in focus is determined by the image sensor. A position and attitude of the stylus device and the display is determined based on the determined size.

In an implementation, light emitted from a plurality of pixels of a display is received at an image sensor of a stylus device. Each of the pixels has an associated location on the display. The location of at least one of the pixels is determined based on the received light by the image sensor of the stylus device. A position of the stylus device is determined with respect to the display by the image sensor of the stylus device based on the determined location of the at least one pixel.

This summary is provided to introduce a selection of concepts in a simplified form that is further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 5 is an illustration of an example encoding scheme for encoding locations using pixel quads;

DETAILED DESCRIPTION

Figure 1:
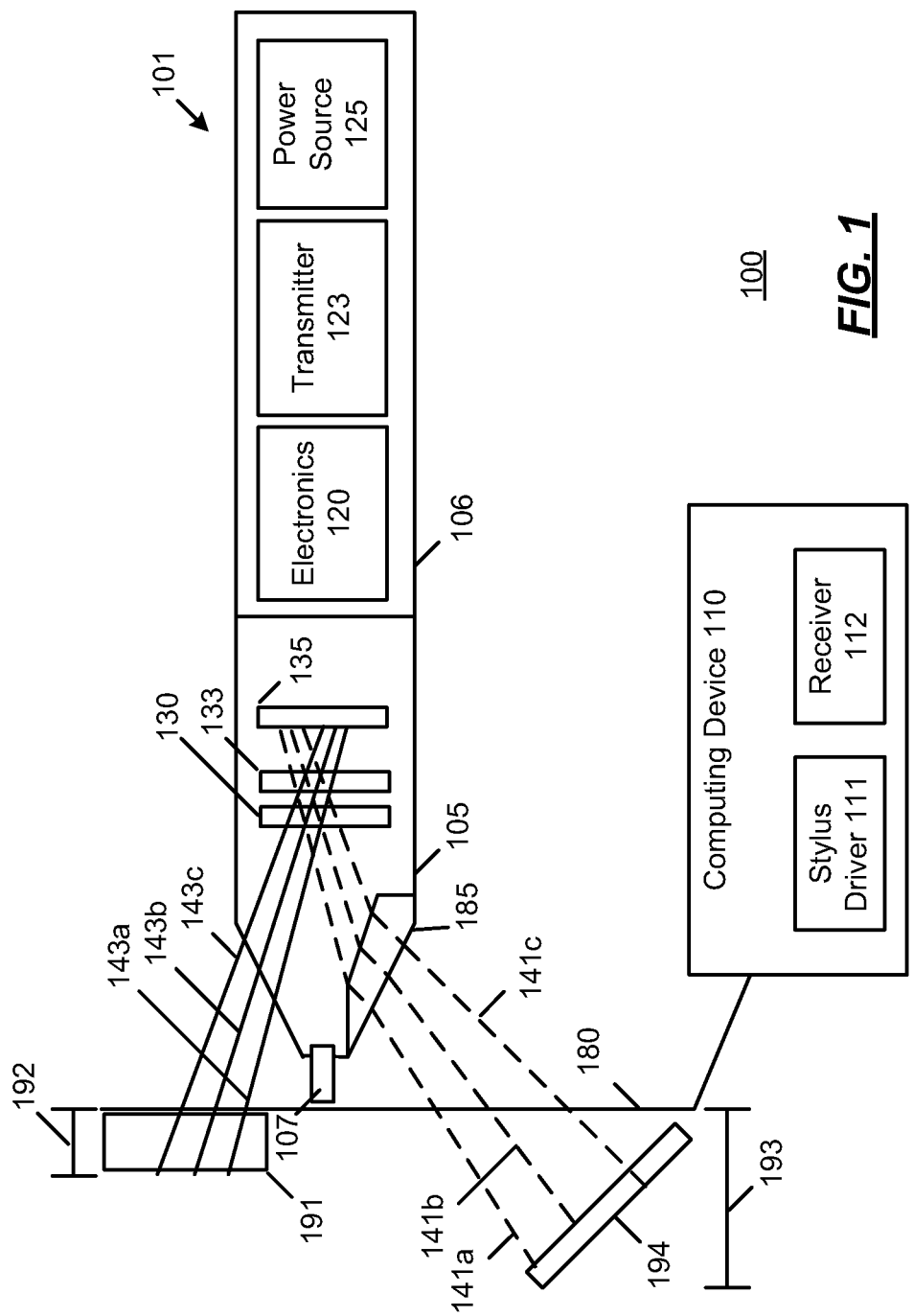
FIG. 1 is an illustration of an example environment for using a stylus device.

FIG. 1 is an illustration of an example environment 100 for using a stylus device 101. As illustrated, the environment 100 includes the stylus device 101 and a display 180 coupled to a computing device 110. The display 180 may include a variety of display types including, but not limited to, a liquid crystal display (LCD). The display 180 may include a plurality of pixels with each pixel associated with a location on the display 180. The computing device 110 may drive the display 180 and may be implemented using one or more general purpose computing devices such as the computing device 900 described with respect to FIG. 9, for example.

The stylus device 101 may include a nose portion 105 coupled to a body portion 106. The stylus device 101 may be configured to be held by a user by the body portion 106 and may be used to interact with an image displayed by the display 180 using the nose portion 105. For example, a user may use the stylus device 101 to control a cursor displayed on the display 180, or to interact with one or more icons or graphics that are part of the image displayed by the display 180, by holding the body portion 106 and changing the position of the nose portion 105 with respect to the display 180. The stylus device 101 may be powered by a power source 125, such as batteries, for example. The power source 125 may be located in the body portion 106.

The stylus device 101 may include a contact sensor 107 coupled to the nose portion 105 of the stylus device 101. The contact sensor 107 may comprise a button or a pressure sensitive switch for example, that may be actuated when a user presses the nose portion 105 of the stylus device 101 against the display 180. For example, the user may activate the contact sensor 107 to indicate the selection of an icon displayed by the display 180, or may activate the contact sensor 107 to indicate that the user desires to cause an image of a line to be drawn on the display 180.

The stylus device 101 may further include electronics 120. The electronics 120 may be implemented in the body portion 106 and may include a processor or other electronic components capable of determining the position of the stylus device 101 based on light emitted from the display 180 and received by the stylus device 101. The position of the stylus consists of the in-plane coordinates of an intercept point of the stylus axis with the display plane 180 and may include a hover distance. The hover distance may be a distance between the contact sensor 107 and the display 180. In some implementations, the electronics 120 may further determine the stylus attitude, which is described by three angles, the azimuth, the elevation and the rotation of the stylus device 101 with respect to the display 180.

The stylus device 101 may further include a transmitter 123. The transmitter 123 may be implemented in the body portion 106 and may transmit data from the stylus device 101 to a corresponding receiver 112 at the computing device 110. The transmitted data may include the determined position and attitude of the stylus device 101. The transmitted data may further include any data associated with the actuation of the contact sensor 107 and/or user activated buttons or touch sensors. The transmitter 123 may be a wireless transmitter, such as a Bluetooth transmitter. However, any other type of wireless or wired transmission means may be used.

The receiver 112 may provide transmitted data to a stylus driver 111. The stylus driver 111 may move or adjust one or more cursors or icons displayed by the computing device 110 in accordance with the data received from the stylus device 101. The stylus driver 111 may be a software application that is executed by the computing device 110. As will be described further below, the stylus driver 111 may further encode one or more signals or patterns into the light displayed by the pixels of the display 180 that may be used by the electronics 120 to determine the position of the stylus device 101.

The stylus device 101 may further include a lens 130. The lens 130 may be implemented in the nose portion 105 and may receive light emitted from the display 180 through the nose portion 105. In some implementations, the lens 130 may be a fixed focus lens. However, other types of lenses may be used.

The stylus device 101 may further include an image sensor 135. The image sensor 135 may be implemented in the nose portion 105 and may receive light emitted from one or more pixels of the display 180 that passes through the lens 130. The received light may form an image on the image sensor 135 that may be used by the electronics 120 to determine the position and/or attitude of the stylus device 101. In some implementations, the image sensor 135 may be a 256 pixel by 256 pixel image sensor. However, other sized image sensors may be used.

The stylus device 101 may further include an optical element 185. The optical element 185 may be implemented in the nose portion 105 and may receive light emitted from the display 180 (illustrated in FIG. 1 using hashed lines as rays 141a, 141b, and 141c). The received rays 141a-c may pass through the optical element 185 and may be directed through the lens 130 and onto the image sensor 135.

The optical element 185 may be used by the stylus device 101 to increase the field curvature of the image that is projected onto the image sensor 135 through the lens 130. Field curvature is a measure of the flatness of a range from which an image is taken. Generally a lens, such as the lens 130, is constructed to reduce or minimize field curvature. However, because of the physical limit to the depth of field for fixed focus lenses, the realizable hover distances for a stylus device 101 using such a lens may be insufficient for common applications. By increasing the field curvature of the projected image using the optical element 185, the effective depth of field of the lens 130 is increased along with the range of detectable hover distances and/or positions. However, such increases in depth of field are at the expense of the amount of the projected image that is in focus.

For example, the rays 143a, 143b, and 143c illustrated by solid lines represent hypothetical rays of light emitted from the display 180 that pass through the lens 130 without the benefit of the optical element 185. The resulting depth of field for an image formed on the image sensor 135 by the rays 143a, 143b, and 143c is shown by the box 191. The depth of field is the distance 192. In this case, the stylus device 101 is able to track its position as long as a part of the display 180 lies within the volume represented by the box 191 from which the image sensor 135 can acquire an in-focus image of the display 180. Because no pixels of the display 180 may be in focus in the image formed on the image sensor 135 outside of the volume represented by the box 191, the range of detectable hover distances for such a lens 130 is limited to a distance 192.

In contrast, the depth of field for an image formed on the image sensor 135 by the rays 141a, 14ab, and 141c that pass through the optical element 185 is shown by the box 194. By increasing the field curvature of the image formed on the image sensor 135, the range of detectable hover distances is increased from the distance 192 to the distance 193. However, the portion of the image on the image sensor 135 that is in focus at any given distance is similarly reduced.

In some implementations, the optical element 135 may comprise any optical element that is capable of increasing the field curvature of the lens 130. For example, the optical element may comprise a refractive element, such as a prismatic refractive element or a rotationally symmetric bi-conical element. In another example, the optical element 135 may comprise a reflective element such as a mirror. In addition, in some implementations, the optical element 135 may comprise a plurality of optical elements such as a plurality of planar facets or surfaces, for example.

The electronics 120 may determine the hover distance of the stylus device 101 based on the areas or shapes of the portions of the image formed on the image sensor that are in focus. In particular, the electronics 120 may determine the hover distance of the stylus based on the radii of the portions of the image formed on the image sensor 135 that are in focus versus the area of the portions of image formed on the image sensor 135 that are not in focus.

Figure 2:
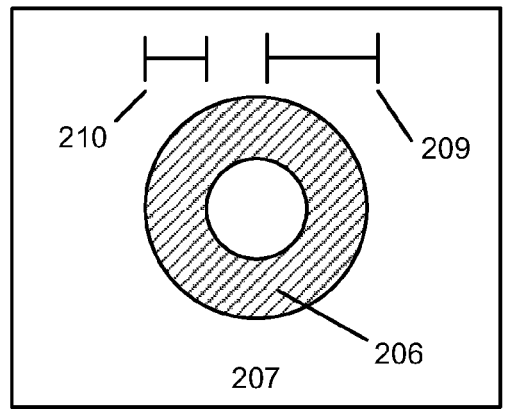
FIG. 2 is an illustration of an image formed on a sensor of a stylus device.

For example, FIG. 2 is an illustration of an image 200 formed on the image sensor 135. The image 200 includes an in-focus portion 206 and out-of-focus portions 207. In the example shown, the optical element 185 is a rotationally symmetrical refractive optical element 185 resulting in the in-focus portion 206 being a ring-shaped elliptical area. The in-focus portion 206 is illustrated with shading, and the out-of-focus portions 207 are illustrated without shading. The shape and number of in-focus portions 206 may vary depending on the type of optical element 185 used.

As the stylus device 101 moves closer to the display 180, the radius of the in-focus portion 206 decreases. Similarly, as the stylus device 101 moves farther from the display 180, the radius of the in-focus portion 206 increases. Thus, the hover distance is proportional to the radius of the in-focus portion 206. In some implementations, the radius of the in-focus portion 206 may be determined based on the difference between the inner and outer radii of the ring shape formed by the in-focus portion 206. Accordingly, the electronics 120 of the stylus device 101 may determine the hover distance of the stylus device 101 based on the radius of the in-focus portion 206.

Figure 3:
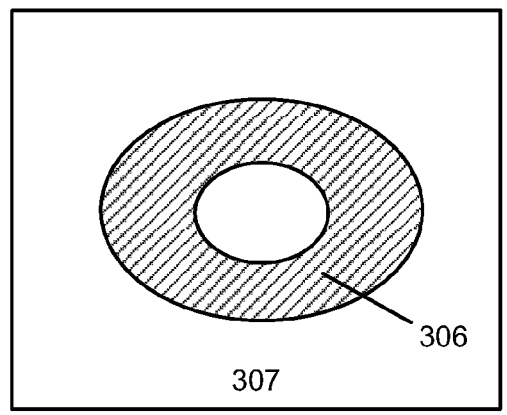
FIG. 3 is another illustration of an image formed on a sensor of a stylus device.

The electronics 120 may similarly determine the orientation of the stylus device 101 based on an eccentricity of the portions of the image formed on the image sensor 135 that are in focus. For example, FIG. 3 is an illustration of an image 300 formed on the image sensor 135. The image 300 includes an in-focus portion 306 and out-of-focus portions 307. The in-focus portion 306 is illustrated with shading, and the out-of-focus portions 307 are illustrated without shading. Where the optical element 185 is a rotationally symmetrical refractive optical element 185, the orientation of the stylus device 101 may be measured according to the eccentricity of the ellipse formed by the outside of the ring shaped in-focus portion 306. As a user of the stylus device 101 reduces the angle formed between the stylus device 101 and the display 180, the eccentricity of the ellipse increases. Where the optical element 185 is a non-rotationally symmetrical optical element, or includes a plurality of optical elements, the eccentricity of the in-focus portion or portions may be a measurement of how warped or deformed the in-focus portion 306 is when compared to a reference or baseline in-focus portion 306.

Figure 4:
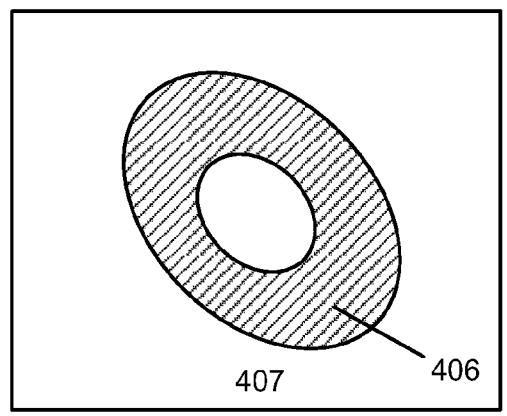
FIG. 4 is another illustration of an image formed on a sensor of a stylus device.

The electronics 120 may similarly determine the azimuth or rotation of the stylus device 101 based on an orientation of the portions of the image formed on the image sensor 135 that are in focus. For example, FIG. 4 is an illustration of an image 400 formed on the image sensor 135. The image 400 includes an in-focus portion 406 and out-of-focus portions 407. The in-focus portion 406 is illustrated with shading, and the out-of-focus portions 407 are illustrated without shading. As the stylus device 101 rotates about an axis through the contact sensor 107 and the body portion 106, the in-focus portion 406 similarly rotates. Where the optical element 185 is a rotationally symmetrical refractive optical element, the azimuth of the stylus device 101 may be measured according to the rotation of the ellipse formed by the outside ring of the in-focus portion 406 about a selected normal. Where the in-focus portion 406 is multiple portions, the azimuth of the stylus device 101 may be measured according to the rotation of one of the portions about the selected normal.

The electronics 120 may further determine the position of the stylus device 101 with respect to the display 180. The position of the stylus device 180 may be determined by the electronics 120 by determining the location of the pixels on the display 180 whose light forms the in-focus-portion of the image formed on the image sensor 135.

In some implementations, the stylus driver 111 may encode the location of each pixel into the light emitted from the pixels by the display 180. The electronics 120 may then determine the position of the stylus device 101 based on the encoded location in the light received by the image sensor 135. In some implementations, each pixel of the display 180 may comprise a triad of elements with each element capable of emitting one of blue, green, or red light. The location of a pixel may be encoded into one of the three colors of light emitted by the elements of the triad. In general, the spatial resolution of the human eye is lower for blue light, than red light or green light. Thus, by encoding the location of a pixel into the blue light a probability that a user will perceive the encoded location is reduced.

In some implementations, to facilitate the encoding scheme described above, the stylus device 101 may further include a filter 133 located between the lens 130 and the image sensor 135. The filter 133 may be a high-pass filter and may block one or more wavelengths of light from reaching the image sensor 135. Where the location of each pixel is encoded into the light using blue light, the filter 133 may only allow blue light emitted from the pixels of the display 180 to reach the image sensor 135. By blocking the red light and green light of each pixel, the apparent pixel contrast is increased for each pixel, and chromatic aberrations introduced by the optical element 185 are reduced.

Figure 5:
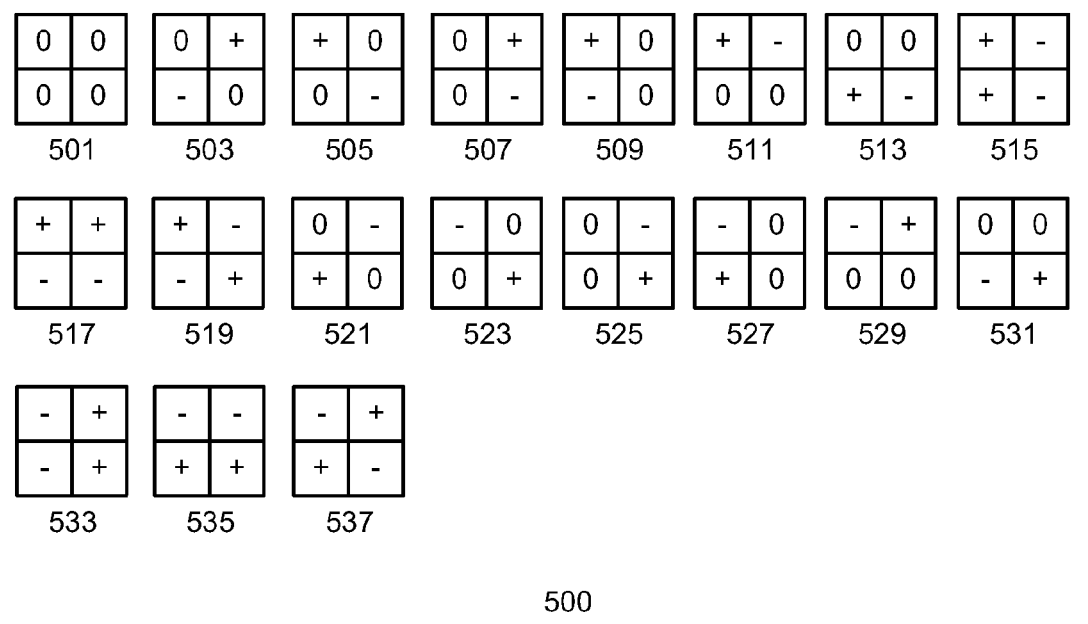

FIG. 5 is an illustration of an example encoding scheme 500 for encoding locations of pixels using pixel quads. In the example shown, the pixels are grouped into quads of four pixels with each quad of pixels corresponding to a location on the display 180. The intensities for these four pixels may be set to the average of their original values, which is equivalent to a low-pass filter operation. In order to convey their locations, each pixel quad may alternate the intensity of the blue light emitted by their corresponding blue elements according to patterns 501, 503, 505, 507, 509, 511, 513, 515, 517, 519, 521, 523, 525, 527, 529, 531, 533, 535, and 537 of the encoding scheme 500. Each pixel quad may display a unique sequence of the patterns 501-537 that may be detected by the electronics 120 and used to determine the location of the pixel quad (and the stylus device 101) on the display 180.

In the encoding scheme 500, the intensity of the blue components of the pixels in a quad is altered according to the 19 patterns 501-537. A "0" symbol in a quadrant indicates that the intensity of the pixel with respect to blue light is not changed. A "+" symbol in a quadrant indicates that the intensity of the pixel with respect to blue light is increased. A "−" symbol in a quadrant indicates that the intensity of the pixel with respect to blue light is decreased. The intensity of a pixel may be increased or decreased by a small amount such as ten percent, for example. For each pattern, the total amount of light emitted by the pixel quad may remain unchanged.

To avoid perception of the encoding scheme by a user, the number of pixels in a quad whose intensity is increased or decreased is balanced. For example, the pattern 501 has no pixels whose intensity is increased or decreased, the pattern 503 has one pixel whose intensity is increased and one pixel whose intensity is decreased, and the pattern 519 has two pixels whose intensity are increased and two pixels whose intensity are decreased. There are 19 patterns 501-537 that meet the balancing requirement and encoding scheme 500 outlined above and shown in FIG. 5.

Once the electronics 120 identifies the location in the display 180 for a pixel quad, the electronics 120 can use the location information to infer the location of each pixel in the quad. Because of this, displays with up to 2,048 by 2,048 pixels may use a 20 bit number to encode the location of each pixel quad. Given the 19 patterns 501-537 in the encoding scheme 500, this 20 bit number can be displayed in 6 frames by the display 180. Using 6 frame encoding with the 19 patterns 501-537 results in $19^6$ possible codes, which is equivalent to approximately 25 bits. These extra bits can be used by the stylus driver 111 for redundant encoding to increase reliability and/or noise reduction, for example.

In some implementations, the electronics 125 may use standard decoding algorithms such as the Viterbi algorithm to determine an initial stylus device 101 position with respect to the display 180 based on the encoding scheme 500 during what is referred to a synchronizing phase. During the synchronizing phase, the electronics 125 may have either lost the position of the stylus device 101 or the stylus device 101 has been recently initialized, for example. After the electronics 125 determine the position of the stylus device 101, the electronics 125 may determine subsequent positions of the stylus device 101 by tracking the pixels of the display device passed by the stylus device 101 using the image sensor 135. If the stylus device 101 becomes unable to determine its position based on pixel tracking, the electronics 125 may reenter the synchronizing phase to determine the position of the stylus device 101. For example, the user may have put the stylus device 101 down, or otherwise held it too far from the display 180.

In some implementations, the electronics 125 may signal the stylus driver 111 when the stylus device 101 is in the synchronization phase. The stylus device 101 may then encode the location of the pixels into the light emitted by the pixels during the synchronization phase, and may stop encoding the location of the pixels into the light after the electronics 125 signals that it has successfully determined the position of the stylus (i.e., has exited the synchronization phase). By only encoding light during the synchronization phase, the likelihood that a user will detect or be bothered by the encoded patterns is reduced.

Figure 6:
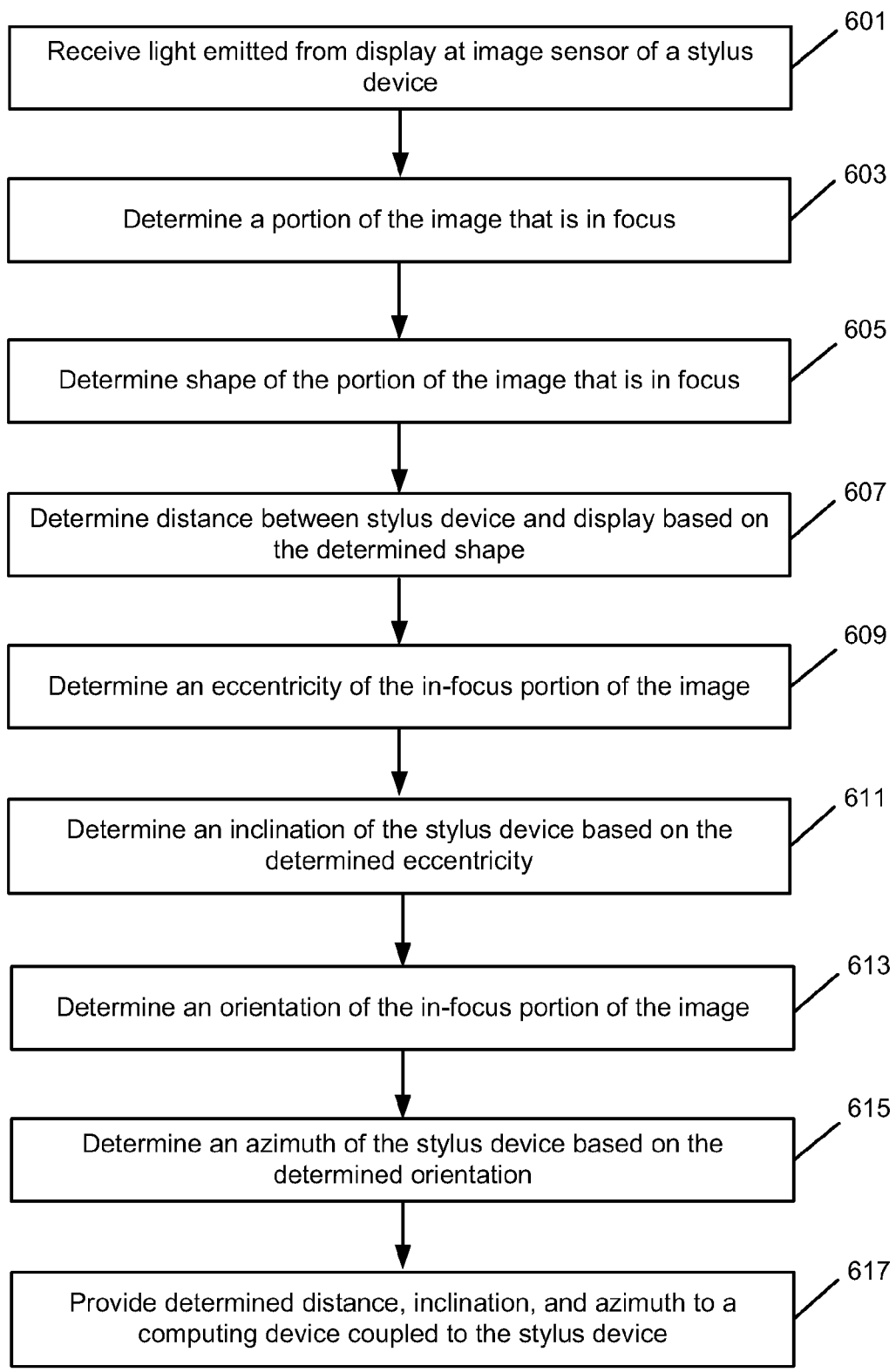
FIG. 6 is an operational flow of an implementation of a method for determining a distance, orientation, and azimuth of a stylus device.

FIG. 6 is an operational flow of an implementation of a method for determining a distance, orientation, and azimuth of a stylus device. The method 600 may be implemented by one or both of a stylus device 101 and a computing device 110, for example.

Light emitted from a display is received at an image sensor of a stylus device at 601. The light may be received by the image sensor 135 through an optical element 185 and may form an image on the image sensor 135. The optical element 185 may increase the field curvature of the image formed on the image sensor 135. The optical element 185 may be a refractive or a reflective optical element 185. In addition, the optical element 185 may be implemented using a plurality of optical elements.

A portion of the image that is in focus is determined at 603. The portion of the image that is in focus may be determined by the electronics 120 and the image sensor 135. As described above, the optical element 185 increases the field curvature of the image formed on the image sensor 135. However, the increase in field curvature comes at the expense of image focus. Depending on the type of optical elements used, there may be one contiguous portion of the image that is in focus, or multiple non-contiguous portions of the image that are in focus.

A shape of the portion of the image that is in focus is determined at 605. The size of the portion may be determined by the electronics 120 and the image sensor 135. The shape of the portion that is in focus may be determined by determining the area of the image that is in focus. For example, where the portion is a circular ring-shaped area, the area may be determined based on a radius of the ring-shaped area. Where there are multiple portions of the image that are in focus, the shape of the portion of the image that is in focus may be determined by summing the area of each in-focus portion.

A distance between the stylus device and the display is determined at 607. The distance may be the hover distance and may be determined by the electronics 120 based on the shape or radius of the portion of the image that is in focus.

An eccentricity of the portion of the image that is in focus is determined at 609. The eccentricity of the portion of the image that is in focus may be determined by the image sensor 135 and the electronics 120. Where the portion of the image that is in focus is a generally elliptical ring, the eccentricity may be a measure of how the ellipse formed by the outside of the ring differs from a circle. Where the portion of image is not generally elliptical, or comprises multiple portions, the eccentricity may be a measure of how warped that the portion or portions of the image that are in focus when compared to a reference portion or portions.

An inclination of the stylus device is determined based on the determined eccentricity at 611. The inclination may be a measure of the angle between the stylus device and the display and may be determined by the electronics 120 and the image sensor 135. Generally, the greater the eccentricity, the greater the inclination of the stylus device, and vice versa.

An orientation of the portion of the image that is in focus is determined at 613. The orientation may be determined by the electronics 120 and the image sensor 135. The orientation may be an angular measurement of the rotation of the portion of the image with respect to a normal. Where the in focus portion of the image includes multiple portions, the orientation of one of the portion may be determined.

An azimuth of the stylus device is determined based on the determined orientation at 615. The azimuth may be determined by the electronics 120 and the image sensor 135. Generally, the greater the angle of the determined orientation, the greater the azimuth, and vice versa.

The determined distance, inclination, and azimuth are provided to a computing device coupled to the stylus device at 617. The determined distance, inclination, and azimuth may be provided by the transmitter 123 of the stylus device 101 to the receiver 112 of the computing device 110. The provided data may be used by the stylus driver 111 to update a cursor or icon corresponding to the stylus device 101, for example.

Figure 7:
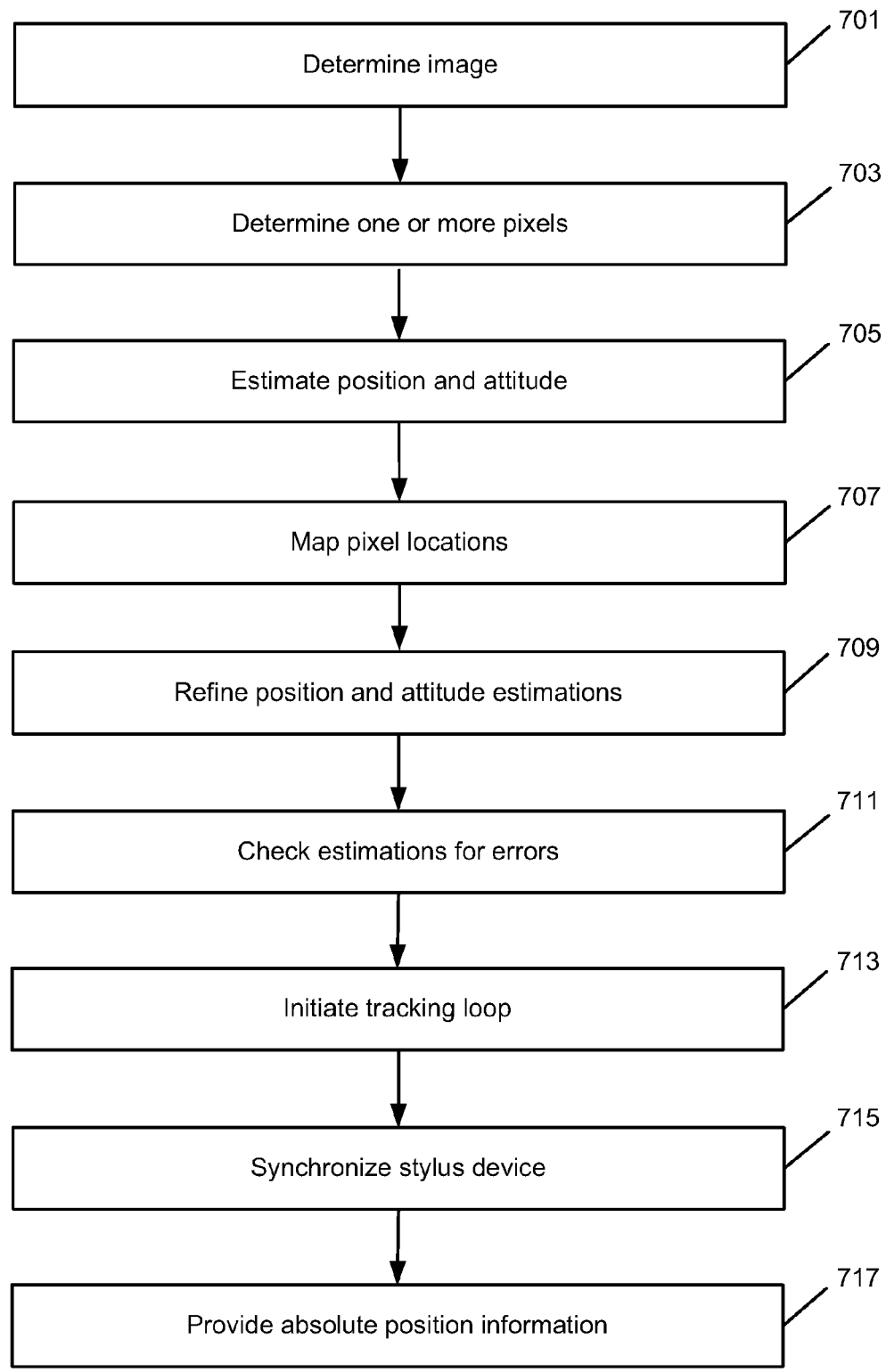
FIG. 7 is an operational flow of an implementation of a method for determining a position and attitude of a stylus device.

FIG. 7 is an operational flow of an implementation of a method 700 for determining a position and attitude of a stylus device. The method 700 may be implemented by one or both of a stylus device 101 and a computing device 110, for example.

An image is determined from an image sensor at 701. The image may be an image formed on the image sensor 135 of the stylus device 101.

The image is processed to determine one or more pixels at 703. The image may be processed by the electronics 120 of the stylus device 101. In some implementations, the image may be processed using an operator (e.g., a convolution with a small kernel) that locates a bright spot that is surrounded by a region of darkness. Given sufficient contrast, the center of the region may be determined to be the center of a pixel from the display 180. The contrast of a pixel may be a measure of how much a pixel is in focus. If the pixel is in focus, it will have a high contrast. If the pixel is near the either end of the depth of field, the contrast will be low. If a pixel is beyond the depth of field, there may be no contrast at all and no pixel may be found.

A position and attitude of the stylus device is estimated at 705. The position and attitude of the stylus device 101 may be estimated by the electronics 120. If a sufficient number of pixels have been identified in the acquired image, the pixel coordinates and contrast (focus) information may be initially used to estimate the position of the stylus device 101 with respect to the display 180. In some implementations, this may be done by the electronics 120 by solving an equation system using a least squared error sum (e.g., a least square fit). Other methods may be used.

Pixel locations are mapped at 707. The pixel locations may be mapped by the electronics 120. In some implementations, the pixels determined at 703 may be mapped to pixel positions on the display 180 based on the geometry of the stylus device optics.

The position and attitude estimations are refined at 709. The estimations may be refined by the electronics 120 based on the mapping of the pixel locations. In some implementations, the estimations may be refined based on the mapping of the pixel locations by solving an equation system with six variables corresponding to x, y, and z position coordinates and azimuth, distance, and rotation angles.

The refined estimations are checked for errors at 711. The refined estimations may be checked for errors by the electronics 120. The estimation may have errors because of the mapping between the determined pixels in the image sensor 135 and the display 180. Because the number of possible mappings is small, the electronics 120 may try all possible mappings and select the estimation of position and attitude with the smallest errors.

A tracking loop may be initiated at 713. The tracking loop may be initiated by the electronics 120. During the tracking loop, the stylus position and attitude may be continuously determined with respect to a starting pixel location.

The stylus device is synchronized at 715. The stylus device 101 may be synchronized by the electronics 120 using an absolute position decoding algorithm. In some implementations, the absolute position decoding algorithm may result in the determination of an absolute position with respect to the display 180. The absolute position decoding algorithm may complete when either a sufficient number of display 180 frames have been analyzed or a sufficiently large region of the display 180 has been observed during tracking.

Absolute position information is provided at 717. The absolute position information may be provided by the electronics 120 to the computing device 110. The absolute position information may be tracked by the electronics 120 and continuously provided to the computing device 110 as the stylus device 101 is moved.

Figure 8:
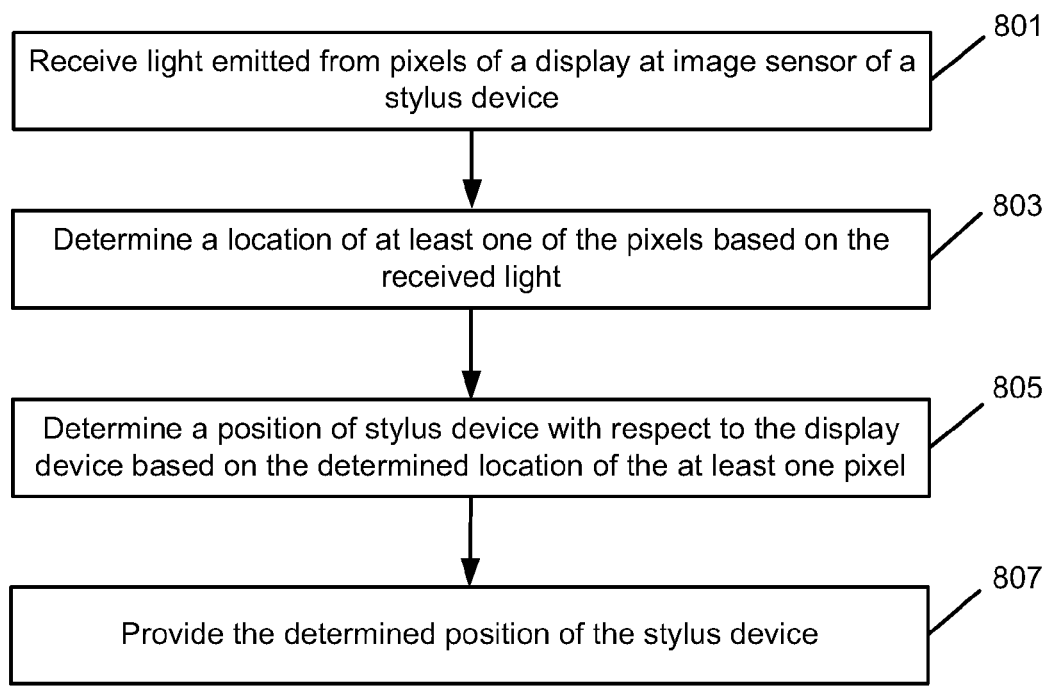
FIG. 8 is an operational flow of an implementation of a method for determining a position of a stylus device.

FIG. 8 is an operational flow of an implementation of a method for determining a position of a stylus device. The method 800 may be implemented by one or more of a stylus device 101 and a computing device 110.

Light emitted from a plurality of pixels of a display is received at an image sensor of a stylus device at 801. The light may be received on the image sensor 135 of the stylus device 101 from the plurality of pixels of the display 180. The stylus device 101 may have been held towards the display, for example, and may be trying to determine its location in front of the display by determining the location of the pixels on the display whose light is received by the image sensor 135. In some implementations, the received light may be received through the filter 133.

A location of at least one of the pixels is determined based on the received light at 803. The location may be determined by the electronics 120 and the image sensor 135 of the stylus device 101. In some implementations, the location may be determined based on a code or patterns encoded into the emitted light by the stylus driver. For example, in some implementations, the stylus driver 111 may group the pixels of the display into quads of four pixels. Each quad of four pixels may display a unique sequence of a pattern by increasing, decreasing, or not adjusting the amount of blue light displayed by each pixel in the quad. Because each sequence of the patterns displayed by each quad is unique, the electronics 120 may determine a location of at least one of the pixels in the quad based on the unique sequence of patterns. Such patterns are described with respect to FIG. 5, for example.

A position of the stylus device with respect to the display is determined based on the location of the at least one pixel at 805. The position may be determined by the electronics 120 of the stylus device 101.

The determined position of the stylus device is provided at 807. The determined position may be provided to the receiver 112 of the computing device 110 by the transmitter 123 of the stylus device 101. The stylus driver 111 may use the provided position to update a cursor or icon corresponding to the stylus device 101, for example.

Figure 9:
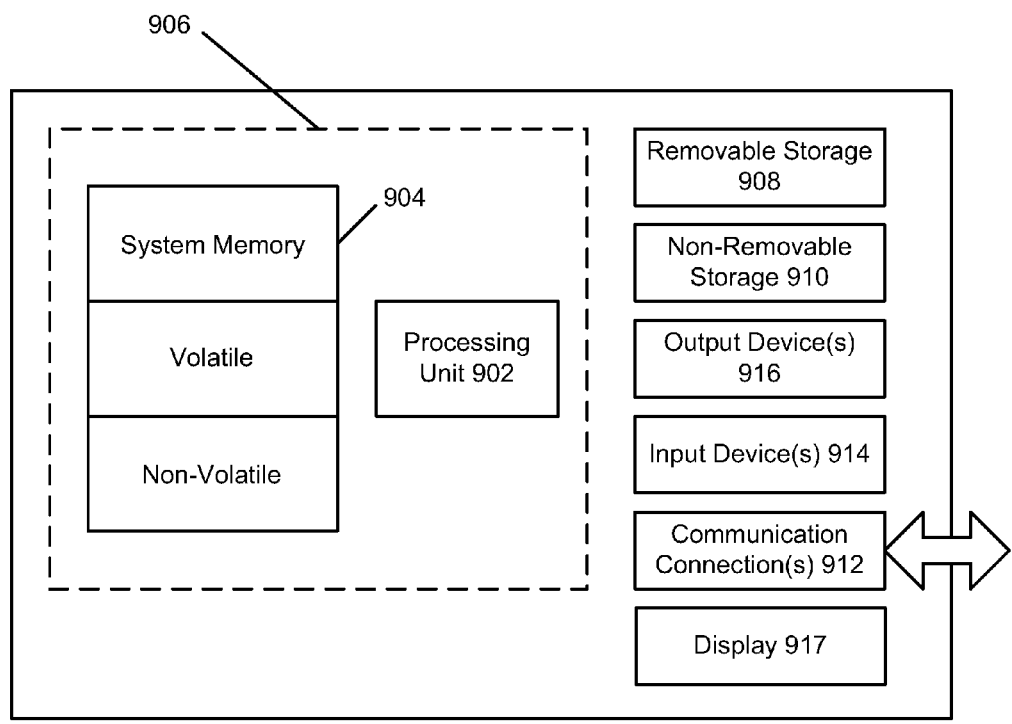
FIG. 9 is a block diagram of a computing system environment according to an implementation of the present system.

FIG. 9 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, smart-phones, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer readable media. Computer readable media can be any available media that can be accessed by device 900 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may contain communications connection(s) 912 that allow the device to communicate with other devices. Computing device 900 may also have input device(s) 914 such as a keyboard, mouse, pen, voice input device, stylus, touch input device, etc. Output device(s) 916 such as speakers, printer, etc. may also be included. All these devices are well known in the art and need not be discussed at length here.

Computing device 900 may also have a display 917. The display 917 may include a variety of well known display types including liquid crystal displays, cathode ray tube displays, organic light emitting diode displays, etc. Any type of display known in the art may be used. An example display is the display 180 illustrated with respect to FIG. 1.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
    receiving light emitted from a display at an image sensor of a stylus device, wherein the received light forms an image on the image sensor;
    determining a portion of the image that is in focus by the image sensor; and
    determining a position and attitude of the stylus device based on a shape and a radius of the portion of the image that is in focus.

2. The method of claim 1, wherein the light is received by the image sensor through an optical element that increases a field curvature of the image formed on the image sensor.

3. The method of claim 2, wherein the optical element is one of a reflective optical element or a refractive optical element.

4. The method of claim 3, wherein the refractive optical element is one of a prism element or a rotationally symmetric bi-conical element.

5. The method of claim 3, wherein the refractive optical element comprises one or more planar facets.

6. The method of claim 1, wherein the determined position is proportional to the shape of the portion.

7. The method of claim 1, wherein the portion of the image that is in focus is an ellipse-shaped ring, and further comprising:
    determining an eccentricity of the ellipse-shaped ring; and
    determining an inclination of the stylus device based on the eccentricity of the ellipse-shaped ring.

8. The method of claim 1, wherein the portion of the image that is in focus is an ellipse-shaped ring, and further comprising:
    determining an orientation of the ellipse-shaped ring; and
    determining an azimuth of the stylus device based on the orientation of the ellipse-shaped ring.

9. A method comprising:
    encoding a pattern onto light emitted from a plurality of pixels of a display by a computing device coupled to the display, wherein each of the pixels has an associated location on the display, wherein the plurality of pixels are organized into quads and each quad comprises four pixels and has an associated location on the display, and further wherein encoding the pattern onto the light emitted from the plurality of pixels comprises adjusting the intensity of one or more of the pixels in each quad according to a sequence of patterns that uniquely identifies the location of each quad;
    receiving the light emitted from the plurality of pixels of the display at an image sensor of a stylus device;
    determining the location of at least one of the pixels based on the received light by the image sensor of the stylus device using the encoded pattern; and
    determining a position of the stylus device with respect to the display by the image sensor of the stylus device based on the determined location of the at least one pixel.

10. The method of claim 9, further comprising providing the determined position of the stylus device to a computing device coupled to the display.

11. The method of claim 9, wherein each pixel comprises a triad having a blue element, a red element, and a green element, and encoding the pattern onto the light emitted from the plurality of pixels further comprises alternatively adjusting an intensity of a blue light emitted from the blue element of each triad.

12. A system comprising:
    a computing device;
    a display coupled to the computing device; and
    a stylus device comprising:
        an optical element; and
        an image sensor, the image sensor adapted to:
            receive light emitted from the display through the optical element, wherein the received light forms an image on the image sensor;
            determine a portion of the image that is in focus;
            determine a radius of the portion of the image that is in focus; and
            determine a distance between the stylus device and the display based on the determined radius.

13. The system of claim 12, wherein the optical element increases a field curvature of the image formed on the image sensor.

14. The system of claim 12, wherein the optical element is one of a reflective optical element or a refractive optical element.

15. The system of claim 12, wherein the portion of the image that is in focus is an ellipse-shaped ring, and the image sensor is further adapted to:
    determine an eccentricity of the ellipse-shaped ring; and
    determine an inclination of the stylus device based on the eccentricity of the ellipse-shaped ring.

16. The system of claim 12, wherein the portion of the image that is in focus is an ellipse-shaped ring, and the image sensor is further adapted to:
    determine an orientation of the ellipse-shaped ring; and
    determine an azimuth of the stylus device based on the orientation of the ellipse-shaped ring.

17. The system of claim 12, wherein the stylus device is adapted to provide the determined distance to the computing device.

* * * * *